(12) United States Patent
Brown et al.

(10) Patent No.: US 9,547,473 B2
(45) Date of Patent: Jan. 17, 2017

(54) DATA PROCESSING

(71) Applicant: Sony Computer Entertainment Europe Limited, London (GB)

(72) Inventors: Neil Jonathan Brown, London (GB); Phillip Rogers, London (GB)

(73) Assignee: Sony Interactive Entertainment Inc. (JP)

( * ) Notice: Subject to any disclaimer, the term of this patent is extended or adjusted under 35 U.S.C. 154(b) by 164 days.

(21) Appl. No.: 14/457,367

(22) Filed: Aug. 12, 2014

(65) Prior Publication Data
US 2015/0052268 A1    Feb. 19, 2015

(30) Foreign Application Priority Data

Aug. 13, 2013   (GB) ................................. 1314439.9

(51) Int. Cl.
  *G06F 13/28*   (2006.01)
  *G06F 13/12*   (2006.01)
  (Continued)

(52) U.S. Cl.
  CPC ............... *G06F 5/16* (2013.01); *G06F 1/1643* (2013.01); *G06F 3/061* (2013.01); *G06F 3/0656* (2013.01);
  (Continued)

(58) Field of Classification Search
  CPC ... G06F 3/00; G06F 3/0425; G06F 2221/2109
  (Continued)

(56) References Cited

U.S. PATENT DOCUMENTS 5,778,443 A    7/1998  Swanberg et al.
6,509,896 B1 *  1/2003  Ogasawara ........... A63F 13/005
                                          345/419
(Continued)

FOREIGN PATENT DOCUMENTS

EP        2793128 A1    10/2014
WO    2007145869 A2    12/2007
(Continued)

OTHER PUBLICATIONS

Extended European Search Report for Application No. 14275158.5 dated Jan. 26, 2015.
(Continued)

*Primary Examiner* — Idriss N Alrobaye
*Assistant Examiner* — Getente A Yimer
(74) *Attorney, Agent, or Firm* — Lerner, David, Littenberg, Krumholz & Mentlik, LLP

(57) ABSTRACT

A data processing apparatus comprises a processor having an internal state dependent upon execution of application program code, the processor being configured to generate display data relating to images to be displayed and to buffer display data relating to a most recent period of execution of a currently executing application. The apparatus includes RAM for storing temporary data relating to a current operational state of program execution. The apparatus also includes a data transfer controller configured to transfer data from the RAM relating to the currently executing application, data relating to a current internal state of the processor and buffered display data to suspend data memory, and to transfer data from the suspend data memory to RAM and to the processor to recreate an execution state of an application at a time the suspend instruction was executed, and to retrieve display data relating to the resumed application.

18 Claims, 12 Drawing Sheets

(51) Int. Cl.
*G06F 13/38* (2006.01)
*G06F 5/16* (2006.01)
*G06F 1/16* (2006.01)
*G06F 9/44* (2006.01)
*G06F 3/06* (2006.01)
*G06F 9/46* (2006.01)
*G06F 9/48* (2006.01)
*G06F 13/32* (2006.01)
*G09G 5/39* (2006.01)
*G06F 11/14* (2006.01)

(52) U.S. Cl.
CPC ........... *G06F 3/0683* (2013.01); *G06F 9/4418* (2013.01); *G06F 9/461* (2013.01); *G06F 9/4881* (2013.01); *G06F 11/1446* (2013.01); *G06F 13/32* (2013.01); *G06F 11/1438* (2013.01); *G06F 2003/0691* (2013.01); *G09G 5/39* (2013.01)

(58) Field of Classification Search
USPC ........................................ 710/23, 67, 72, 73
See application file for complete search history.

(56) References Cited

U.S. PATENT DOCUMENTS

| | | | |
|---|---|---|---|
| 2003/0043771 A1* | 3/2003 | Mizutani | H04W 76/02 370/338 |
| 2004/0100827 A1 | 5/2004 | Fasoli et al. | |
| 2006/0104283 A1* | 5/2006 | Suzuki | H04L 49/90 370/395.2 |
| 2007/0016586 A1* | 1/2007 | Samji | G06F 17/30235 |
| 2007/0206575 A1* | 9/2007 | Suzuki | G06Q 10/10 370/352 |
| 2007/0288687 A1 | 12/2007 | Panabaker | |
| 2008/0082752 A1 | 4/2008 | Chary et al. | |
| 2008/0225327 A1* | 9/2008 | Smith | G06F 3/1288 358/1.15 |
| 2010/0299556 A1* | 11/2010 | Taylor | G06F 11/0757 714/6.12 |

FOREIGN PATENT DOCUMENTS

| | | |
|---|---|---|
| WO | 2008058276 A2 | 5/2008 |
| WO | 2009085507 A1 | 7/2009 |
| WO | 2013088782 A1 | 6/2013 |
| WO | 2013089686 A1 | 6/2013 |

OTHER PUBLICATIONS

Comined Search and Examination Report for Application No. GB 1314439.9 dated Jan. 27, 2014.

European Examination Report for Application No. 14275158.5 dated Jul. 7, 2015.

* cited by examiner

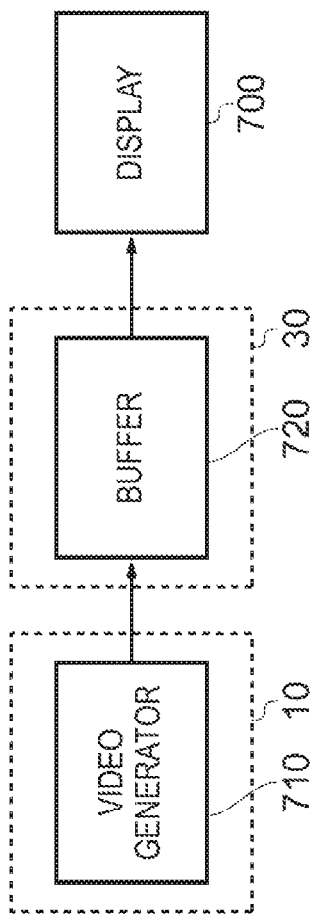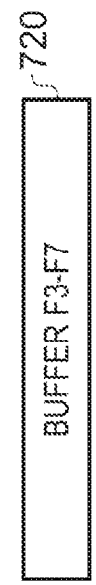
FIG. 14
FIG. 15
FIG. 16

DATA PROCESSING

CROSS REFERENCE TO RELATED APPLICATION

The present application claims the benefit of and priority to UK Patent Application No. GB1314439.9, filed Aug. 13, 2013, the entire content of which is incorporated herein by reference.

BACKGROUND

Field of the Disclosure

This disclosure relates to data processing apparatus and methods.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In some data processing apparatus there is a need to suspend operation of a particular application program in order to start running another, or to allow the data processing apparatus to be powered down. The suspend operation involves storing a copy of the contents of a working memory and, optionally, details of an internal processor state. Later, at a resume operation, the memory contents and processor state are retrieved and reinstated so that the original application can continue to be executed as before, with effect from the point at which it was suspended.

A technical problem relating to the design of a storage arrangement to hold the suspend data is how to achieve a rapid suspend operation and a rapid resume operation. One reason why speed is desirable is simply to provide convenient operation to the user. But a more subtle reason is that if the suspend and resume operations are carried out very quickly, the user might not even realise that they are taking place at all. In other words, if the suspend and resume operations are rapid and execute smoothly, they can give the impression of a capability to switch from one application to another without stopping execution of the first application, rather than suspending one application and resuming another by using the separately stored suspend data.

This disclosure provides data processing apparatus comprising: a processor having an internal state dependent upon execution of application program code by the processor, the processor being configured to generate display data relating to images to be displayed using the associated display in response to the execution of the program code and to buffer display data relating to a most recent period of execution of a currently executing application; a non-volatile data storage arrangement configured to store program code for one or more applications; a random access memory configured to store temporary data relating to a current operational state of program execution while the processor is executing the program code for the currently executing application; a non-volatile suspend data memory; and a data transfer controller configured, in response to a suspend instruction, to transfer data from the random access memory relating to the currently executing application, data relating to a current internal state of the processor and the buffered display data to the suspend data memory, and configured, in response to a resume instruction, to transfer data from the suspend data memory to the random access memory and to the processor so as to recreate the state of execution of an application at the time that the suspend instruction was executed, and to retrieve the display data relating to the resumed application from the suspend data memory, the processor causing the display to display information to the user based on the retrieved display data while the resume instruction is being completed.

The disclosure provides a separate non-volatile memory arrangement for storing suspend data, which in various embodiments can allow for a higher speed for the suspend and resume operations.

Further respective aspects and features of the disclosure are defined by the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 14 schematically illustrates part of the functionality of a CPU, an I/O interface and a display;

FIGS. 15 and 16 schematically illustrate the generation, display and buffering of successive video frames;

DESCRIPTION OF THE EMBODIMENTS

Figure 1:
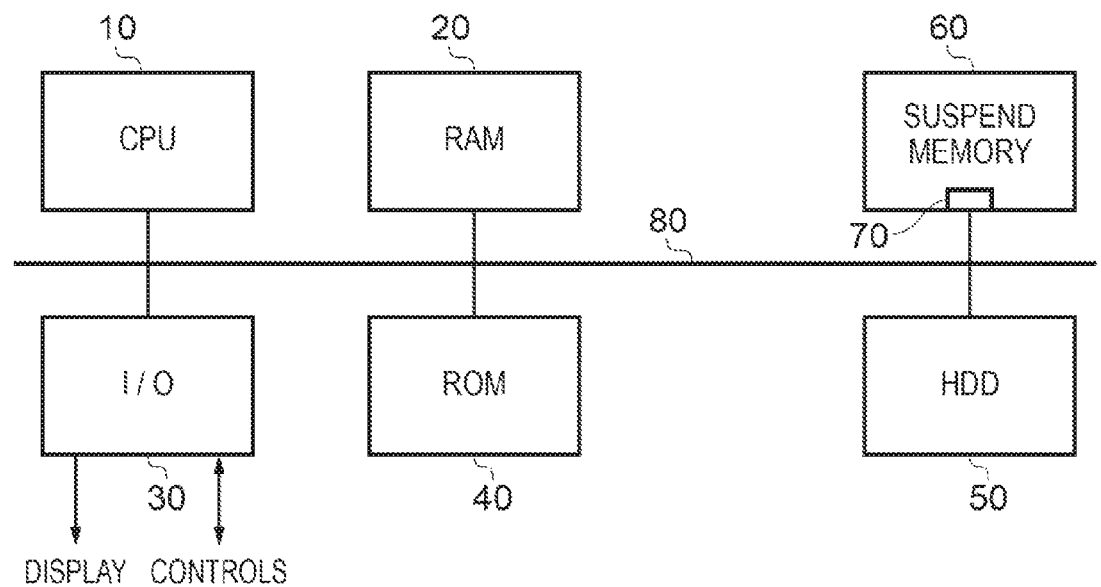
FIG. 1 schematically illustrates a data processing apparatus.

Referring now to the drawings, FIG. 1 schematically illustrates a data processing apparatus comprising a processor (CPU) 10, a random access memory (RAM) 20, and input/output (I/O) controller 30 connectable to, for example, user controls (not shown) and a display device (not shown), a read only memory (ROM) 40 and a hard disk drive (HDD) 50, together forming a non-volatile data storage arrangement configured to store program code for one or more applications, and a suspend data memory 60 associated with a data transfer controller 70. All of these components are connected together by one or more data buses 80.

Note that the functionality of the data transfer controller can in fact be carried out by the CPU 10, or can be carried out by a separate arrangement.

The CPU 10 executes program code retrieved from the ROM 40 or the HDD 50, and uses the RAM to store temporary data relating to a current operational state of program execution while the processor is executing the program code for a current application. The CPU 10 has an internal state dependent upon execution of program code by the CPU. Here, the internal state includes the state of one or more internal registers, and identification of the code being executed by one or more internal threads, the state of one or more internal pipelines and so on.

The non-volatile suspend data memory 60 is separate to the non-volatile data storage arrangement. The suspend data memory is used to store data relating to a current operational state at the time that a "suspend" instruction is issued (for example, by the user operating a user control) in such a way that a different application can then be executed, but if a "resume" instruction is later issued (again, for example, by the user operating a user control) the suspend data stored in the suspend data memory 60 can be retrieved and used to recreate exactly the state of the system at the time that the original application was suspended. So, the data stored in the suspend data memory can include data from the RAM 20 and also data defining the current internal state (at that time) of the CPU 10.

In other words, the data transfer controller is therefore configured, in response to a suspend instruction, to transfer data from the random access memory relating to the currently executing application and data relating to a current internal state of the processor to the suspend data memory, and configured, in response to a resume instruction, to transfer data from the suspend data memory to the random access memory and to the processor so as to recreate the state of execution of an application at the time that the suspend instruction was executed.

One reason why a suspend data memory is useful is that it allows the available size of the RAM 20 to be utilised by a single application rather than having to partition the RAM 20 into smaller segments for multiple applications. Another reason why a suspend data memory is useful is to allow execution of an application to be paused and the data processing apparatus either to carry out an entirely different task or to be switched off, without affecting the ability later to resume execution of that application.

Various types of data processing apparatus (such as a laptop or portable computer) are applicable to the arrangement shown in FIG. 1, but one particular example is a games processing apparatus in which one or more games applications are executed under the control of user controls. Typically the execution of a games application gives rise to user feedback, primarily in the form of video information to be displayed to the user, but also in the form of sound, haptic feedback or the like.

Note that in some examples, the data transfer controller is configured to transfer data relating to a first application from the random access memory and the processor to the suspend data memory during a first time period, and to transfer data relating to a second application from the suspend data memory to the random access memory and the processor during a second time period which at least partially overlaps the first time period. So, a suspend and a resume operation can both be carried out at substantially the same time.

A challenge relating to the design of the suspend data memory 60 is how to achieve a rapid suspend operation and a rapid resume operation. Here, in at least embodiments of the present technology, the word "rapid" refers to an operation which is completed within a few seconds, for example no more than 3 seconds. One reason why rapidity is desirable is simply to provide convenient operation to the user. But a more subtle reason is that if the suspend and resume operations are carried out very quickly, the user might not even realise that they are taking place at all. In other words, the user might believe that the user is simply switching from one application to another, rather than suspending one application and resuming another by using separately stored suspend data. In the case of a games processing apparatus, the quantity of data to be stored in order to suspend an application can be very high, for example up to 5 GB of data for each application. Accordingly, a data transfer rate of greater than 1 GB/s is needed to achieve a "rapid" suspend and resume operation as discussed above.

For these reasons, previously proposed techniques for suspension and resuming of applications are not suitable. For example, one previously proposed technique is to use the HDD (such as the HDD 50) to store suspend data. However, the data transfer rate possible with HDD technology is insufficient. Even if the HDD is replaced by a solid state drive (SSD), it is not possible to obtain a sufficiently high data transfer rate for these purposes.

An approach followed by the present embodiment is to use two or more memory elements, each configured to store a plurality of data bytes, the two or more memory elements being arranged so as to read or write data in parallel with respect to one another; and a multiplexer-demultiplexer configured to route data to be stored by or retrieved from the suspend data memory to or from the two or more memory elements, so that the data read or write rate for the suspend data memory is greater than the data read or write rate for a single such memory element.

Figure 2:
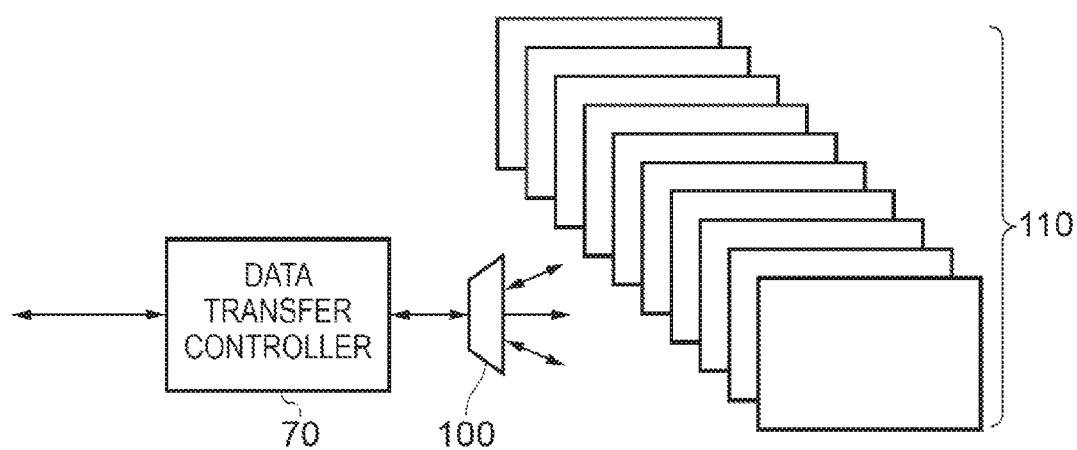
FIG. 2 schematically illustrates a data transfer controller and a memory element array.

FIG. 2 schematically illustrates the data transfer controller 70, a multiplexer-demultiplexer 100 and a memory element array 110 using this technique.

Note that in FIG. 2, the data transfer controller is shown as part of the data path to and from the suspend data memory. This is not essential however, and in other embodiments the data transfer controller could operate alongside the suspend data memory so as to control reading from and writing to the suspend data memory, but without itself being part of the data path.

In one example, each memory element might be a 512 MB flash memory, so that an array of ten such elements is capable of storing 5 GB of data. Based on typical data transfer rates available (at the priority date of the present application) with flash memory devices, such an arrangement could store 5 GB of data in about two seconds. Given that (as discussed above) an application may require 5 GB of suspend data to be stored, one example could be an array of 30 of the 512 MB flash memory elements, which would then allow suspend data relating to 3 applications to be retained concurrently. In another example, an array of 320× 64 MB flash memory elements could store or retrieve over 5 GB in under a second, and could store data relating to four such sets of suspend data.

Figure 3:
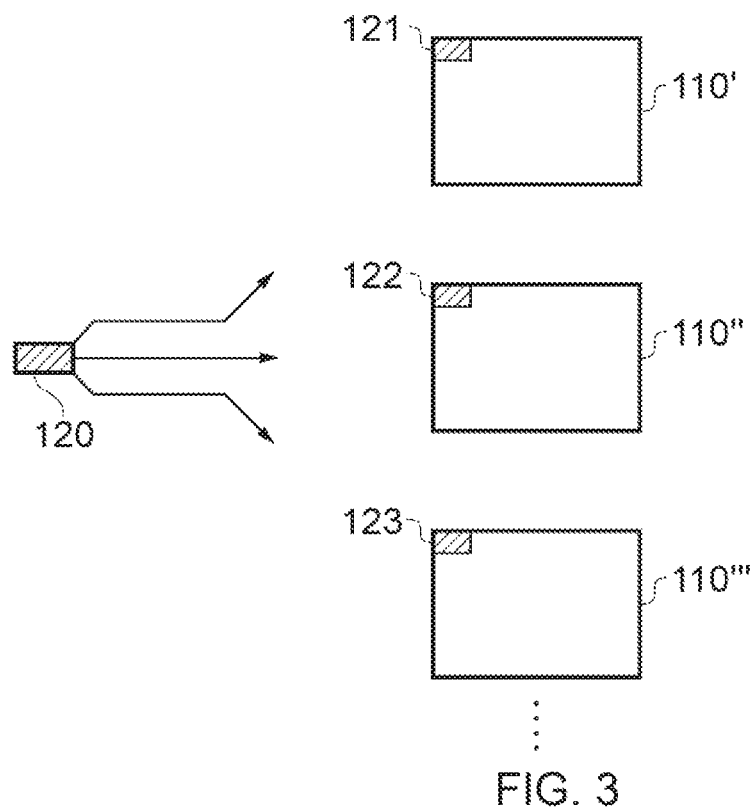
FIG. 3 schematically illustrates a data demultiplexing and multiplexing operation.

Considering first a suspend operation, in which data is written to the suspend data memory, the data to be written is passed to the multiplexer-demultiplexer 100 which partitions the data into separate portions for writing to the respective ones of the array of memory elements 110, so that the data write operations are carried out (as between different ones of the memory elements in the array) in parallel (that is to say, simultaneously or substantially simultaneously). FIG. 3 schematically illustrates such a data demultiplexing and multiplexing operation, in which a segment 120 of incoming data to be written to respective memory elements 110', 110", 110''' is partitioned into portions 121, 122, 123 for writing simultaneously to the respective memory elements. A corresponding process is carried out when data is read from the suspend data memory, in that the required data is reassembled by the multiplexer-demultiplexer from portions stored in (and read simultaneously from) the memory elements of the array 110.

Figure 4:
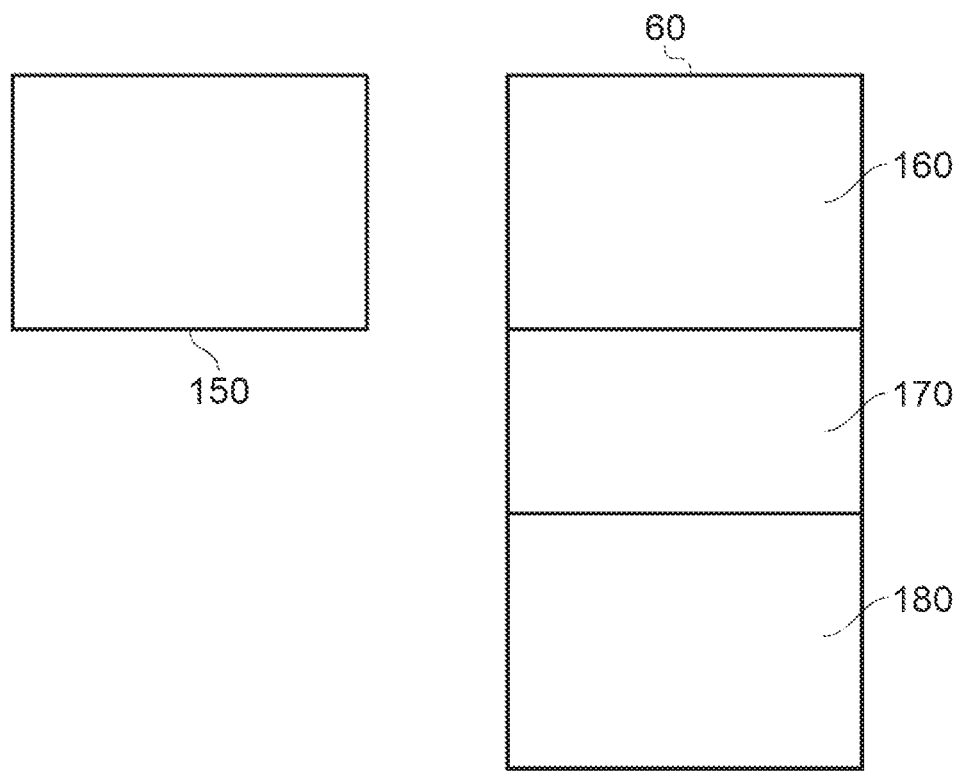
FIG. 4 schematically illustrates data occupancy of a suspend data memory.

FIG. 4 schematically illustrates the data occupancy of a suspend data memory 60. As discussed above, in some example arrangements the suspend data memory has a sufficient size in order that it can hold suspend data relating to two or more applications. This is illustrated schematically in FIG. 4 in that a box 150 schematically represents the quantity of suspend data relating to a current application, and this is stored in a memory area 160 of the suspend data memory 60, alongside memory areas 170, 180 holding data relating to other applications. Note that the memory space (of the RAM) schematically illustrated by the box 150 need not represent the whole space of the RAM. The RAM may be larger, but (for example) some space may be allocated to graphics processing or to operating system requirements, leaving the situation that the remaining space in the RAM is insufficient to allow more than one application to be executed at once. Accordingly, this is an example of an arrangement in which the RAM has a data size sufficient to hold data relating to no more than one currently executing application, and the suspend data memory has a data size sufficient to store data relating to the execution of more than one application. However, in other examples, smaller applications may be used, such that multiple applications may fit into the RAM, or in other words, the RAM has a data size sufficient to hold data relating to one or more currently executing application. Similarly, in some embodiments, the suspend data memory may be able to hold only one application; in other embodiments it may be able to hold more than one. Accordingly, this is an example of an arrangement in which the suspend data memory has a data size sufficient to store data relating to the execution of one or more applications.

Even though the suspend and resume operations may be rapid, there can still be a need to provide the user with information relating to the application which is about to resume, during the actual execution of a resume operation. In some embodiments, a still image may be displayed to the user relating to the application which is about to be resumed. The still image may be stored in and read from a reserved or otherwise identified area of the suspend data memory, for example as a first read operation of the suspend operation. Another arrangement will be described with reference to FIGS. 5a and 5b.

Figure 5A:
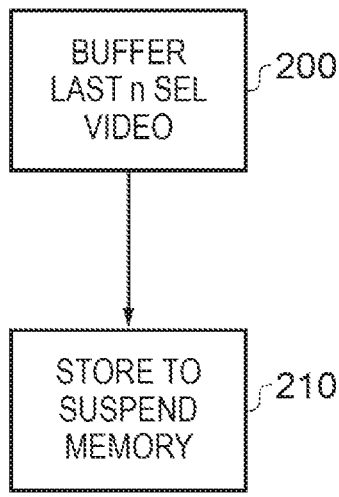
FIGS. 5a and 5b schematically illustrate the storage and retrieval of buffered display data.
Figure 5B:
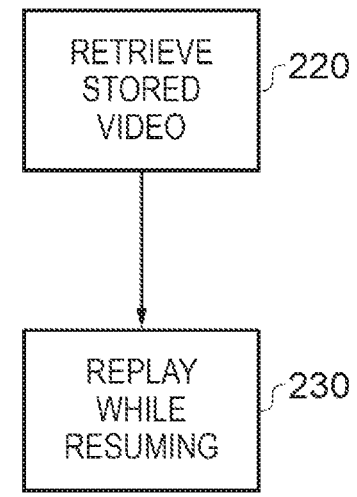

FIGS. 5a and 5b schematically illustrate the storage and retrieval of buffered display data.

In this arrangement, which is particularly (though not exclusively) applicable to a games processing apparatus, the CPU 10 is configured in normal operation to buffer display data relating to a most recent period of application execution; and the data transfer controller is configured to store the buffered display data in the suspend data memory in response to a suspend instruction. For example, the buffered display data could defines a display view as seen by a user, and may comprise still or video data or alternatively games data (such as the position of characters and the nature of the current background) from which video data can be reconstructed. Then, in response to a resume instruction, the processor is configured to replay or reconstruct the video data and then to continue execution of the application at the end of replay of the video data. So, from the user's point of view, the process would go ahead as follows: (a) the user initiates a resume instruction for a particular game; (b) the user (almost instantaneously) sees a replay of (for example) the last few seconds of game action from before the suspend instruction took effect; and (c) this is followed immediately by a continuation of game play from that point.

Although the system may buffer, for example, ten seconds of display data (video data for example), the resume operation may take considerably less than this buffered period to execute. However, it is possible for the system to replay a period of video data longer than the time taken to execute the resume operation (for example, four seconds of video replay) to allow the user to re-familiarise himself with the state of game play before taking over again. Note that during the video replay period, the user's controls will have no effect on the game play as displayed on the display screen, but as soon as actual play restarts, the user will be in control once again. So, it can be helpful in some embodiments to display a countdown timer, superposed over the replayed video, to indicate a countdown (for example, in seconds) to the time at which the user will take over control.

These processes are summarised in FIGS. 5a and 5b. In FIG. 5a, at a step 200 the most recent n seconds (for example, 10 seconds) of display data (such as video) are continuously buffered by the CPU 10. The buffer may be implemented as part of the RAM 20. At a step 210, in response to a suspend instruction, the current contents of the buffer are written to the suspend data memory. In the present example, this is done (by the data transfer controller) as a first operation amongst those operations constituting a suspend operation, so as to ensure that the buffered video is as up to date as possible at the instant that the suspend instruction is issued. In FIG. 5b, in response to a resume instruction, a first operation carried out by the data transfer controller is to retrieve the buffered video at a step 220. Some or all of the buffered video can then be replayed by the CPU at a step 230. During the replay period (for example, at the end of the replay period) the data transfer controller completes the rest of the resume operation, so that game play continues at the end of replay of the buffered video. So, in one example, a full resume operation takes 0.8 seconds. In response to a resume instruction, the data transfer controller immediately retrieves the buffered display data and the processor causes replay of the display data to the user. Then, at a time period (equal to the remaining execution time of the resume operation) before the end of the video replay, the data transfer controller starts execution of the remaining part of the resume operation (that is, the data which has not yet been retrieved). This means that the resumed operation is ready to be implemented as soon as the video replay comes to an end. In turn, this can provide an apparently seamless continuation of game play (or other application execution) for the user.

Further aspects of the operations discussed with respect to FIGS. 5a and 5b will be described with reference to FIGS. 14-18 below.

Figure 6:
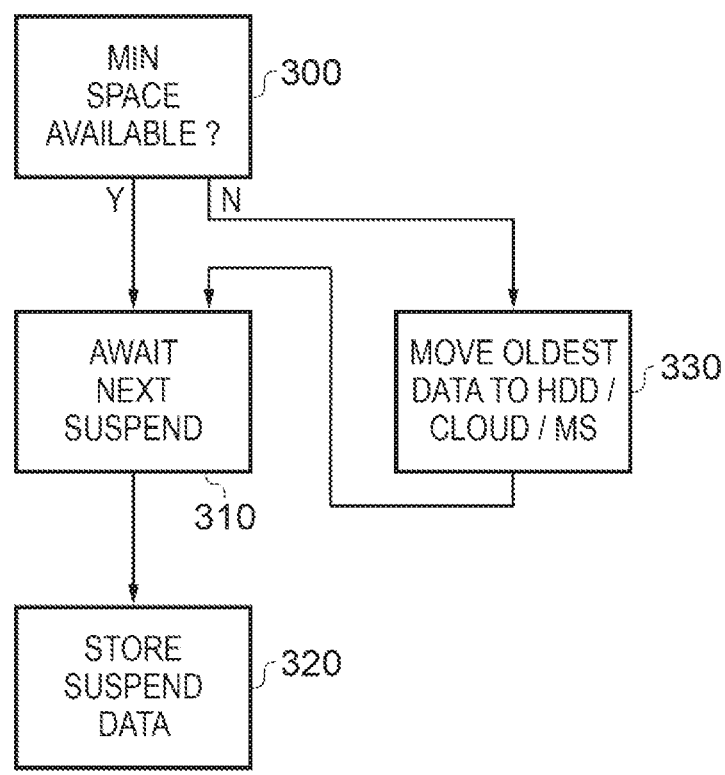
FIG. 6 schematically illustrates an operation to generate free space in the suspend data memory.

FIG. 6 schematically illustrates an operation to generate free space in the suspend data memory, in which the data transfer controller is configured to transfer data from the resume memory to the non-volatile data storage arrangement in order to generate free space in the resume memory for execution of a next suspend instruction.

At a step 300 the data transfer controller detects whether the suspend data memory has sufficient remaining free space to allow a next suspend operation to be carried out. This assessment can be based on an average data requirement (for example, 4 GB), a maximum data requirement (such as 5 GB) or a specific data requirement relating to the currently executing application (which can be obtained by querying the application or metadata associated with the application). The step 300 can be carried out in response to a new application starting, in response to completion of a suspend operation, and/or at other times.

If the answer is yes (that is, there is sufficient free space), then at a step 310 the data transfer controller simply waits for the next suspend operation and, in response to that operation, stores suspend data to the suspend data memory at a step 320. If however the answer is no, then at a step 330 the data transfer controller moves data from the suspend data memory to another storage location (or in another alternative, discards it altogether). The other storage location might be, for example, the HDD 50, cloud based storage or another supplementary storage arrangement such as a portable USB data storage device. The choice of which data to move can depend on various factors. One possibility is to move the oldest suspend data, that is to say the data which corresponds to the least recent suspend operation. In other embodiments, the user could be given a choice of which data to move (or could even be given the option to execute the step 330 even if there is sufficient free space) in order to allow suspend data to be backed up onto an external drive or to allow the user to transfer suspend data from one machine to another.

Figure 7:
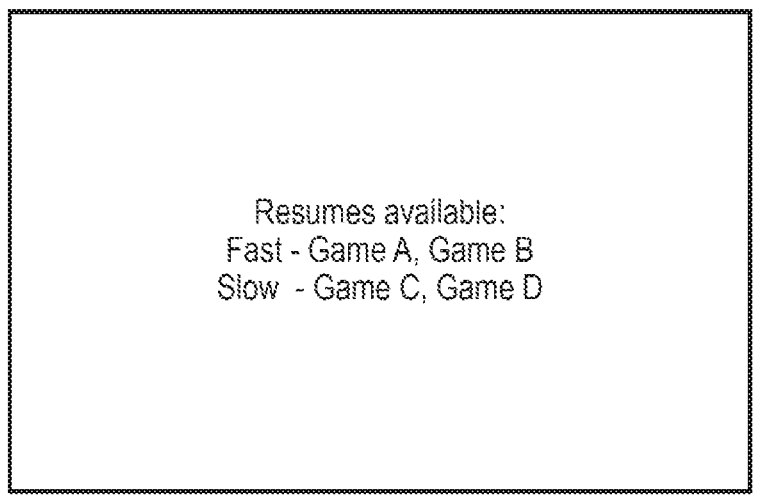
FIG. 7 schematically illustrates a menu display.

FIG. 7 schematically illustrates a menu display in which the user is offered a selection of available resume operations, including "fast" resumes (relating to those having suspend data stored in the suspend data memory 60) and "slow" resumes (relating to those having data moved at the step 330 to a slower access storage medium, assuming that slower access storage medium is still available to the data transfer controller).

Figure 8:
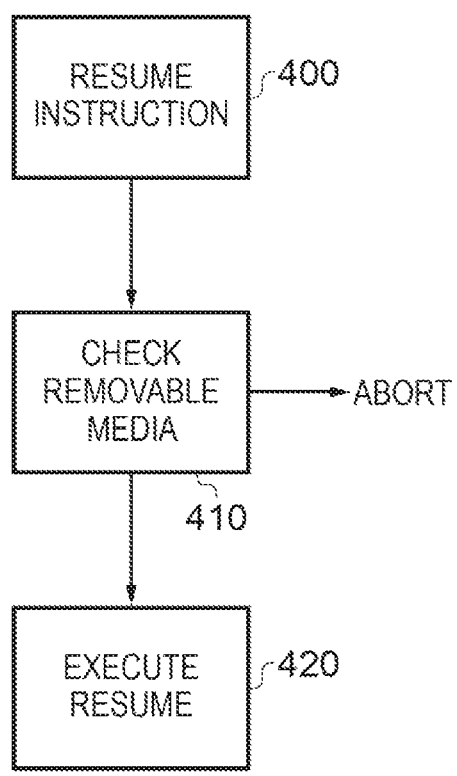
FIG. 8 is a schematic flowchart illustrating another version of a resume instruction.

FIG. 8 is a schematic flowchart illustrating another version of a resume instruction in which the data transfer controller is configured to detect whether the non-volatile data storage arrangement currently stores the appropriate program code relating to a version of an application in respect of which a resume instruction has been issued, and if not, the data transfer controller is configured not to execute that resume instruction.

A resume instruction in respect of a particular application at a step 400 prompts the data transfer controller to check (at a step 410) the status of the non-volatile data storage arrangement. One example, as illustrated in FIG. 8, is that the non-volatile data storage arrangement includes a removable medium reader (such as a Blu-Ray® disc reader), and at least some of the program code for an application is stored on a removable Blu-Ray disc. The data transfer controller checks whether the program disc for the application to be resumed is currently mounted to the disc reader, and (optionally) whether the correct software version is provided. Alternatively, the check at the step 410 could be whether the HDD (as an example of the non-volatile data storage arrangement) contains the required software and (optionally) whether the user authorisations for the suspend data and the stored software correspond. These checks are particularly useful in situations where the user or the system has moved the suspend data to a portable data storage device or to network based storage such as a cloud based storage arrangement, as it can prevent the unauthorised use of suspend data created on one user's machine and/or in one user's account on another user's machine or account.

If the test at the step 410 is passed then the resume operation is executed at a step 420. Otherwise, the process aborts.

In an optional variation of the embodiments described above, it is noted that some areas of RAM may be (for example) used as buffers that get re-used or re-populated every video frame. An example would be so-called render targets, which refers to an area of RAM in which generated images are stored before being shown on screen. These do not need to be saved to the suspend data memory as they are rebuilt every frame anyway, and will be automatically rebuilt when the game resumes. So an implementation of this technique could be used in which not all of the RAM is copied to the suspend data memory, for example copying memory contents relating to an application other than memory areas having contents which will be recreated by the resumed application, or in a more specific example, other than memory areas having contents which will be recreated by the resumed application within a first frame period after the application has resumed.

FIGS. 9a-9f schematically illustrate a data swap technique, which (for example) can accommodate situations in which there is insufficient unused capacity available in the suspend data memory to allow for the contents of the RAM to be written directly to the suspend data memory.

For the sake of this discussion, the RAM 20 and the suspend data memory 60 are illustrated schematically as being partitioned into memory segments 500. These segments may correspond to the memory elements in the array 110, but they need not do so. Similarly, the RAM may be partitioned but need not be so. The partitioning in FIGS. 9a-9f is simply for the purposes of the explanation which follows, to show how different portions of the stored data are transferred between the and the suspend data memory.

Figure 9A:
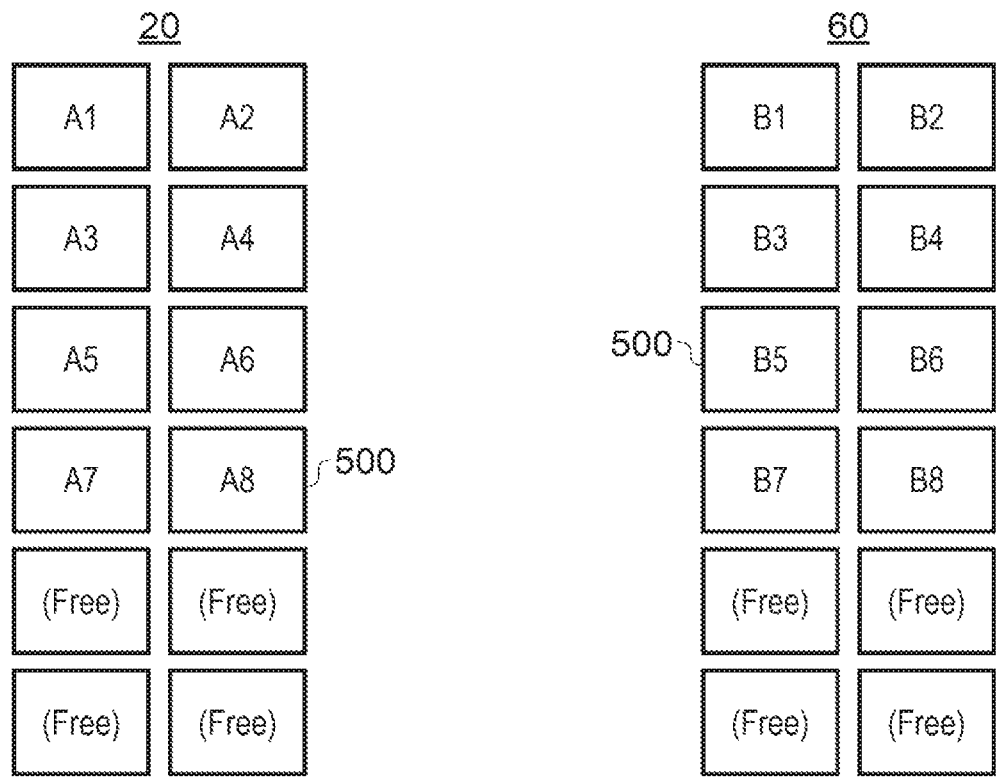
FIGS. 9a-9f schematically illustrate a data swap technique.

Referring to FIG. 9a, the RAM 20 contains 12 segments, eight of which are occupied by data (A1 . . . A8) corresponding to a currently executing application, and four of which are currently unoccupied (free). Similarly, the suspend data memory 60 also comprises 12 segments (though of course the number of segments could be different between the RAM and the suspend data memory), eight of which are occupied by data (B1 . . . B8) corresponding to a suspended application. The number of free segments in the suspend data memory 60 is insufficient to store the whole of the data from the RAM relating to the currently executing application. Therefore, the memory transfer between the suspend data memory and the RAM is carried out in stages which will now be described.

Figure 9B:
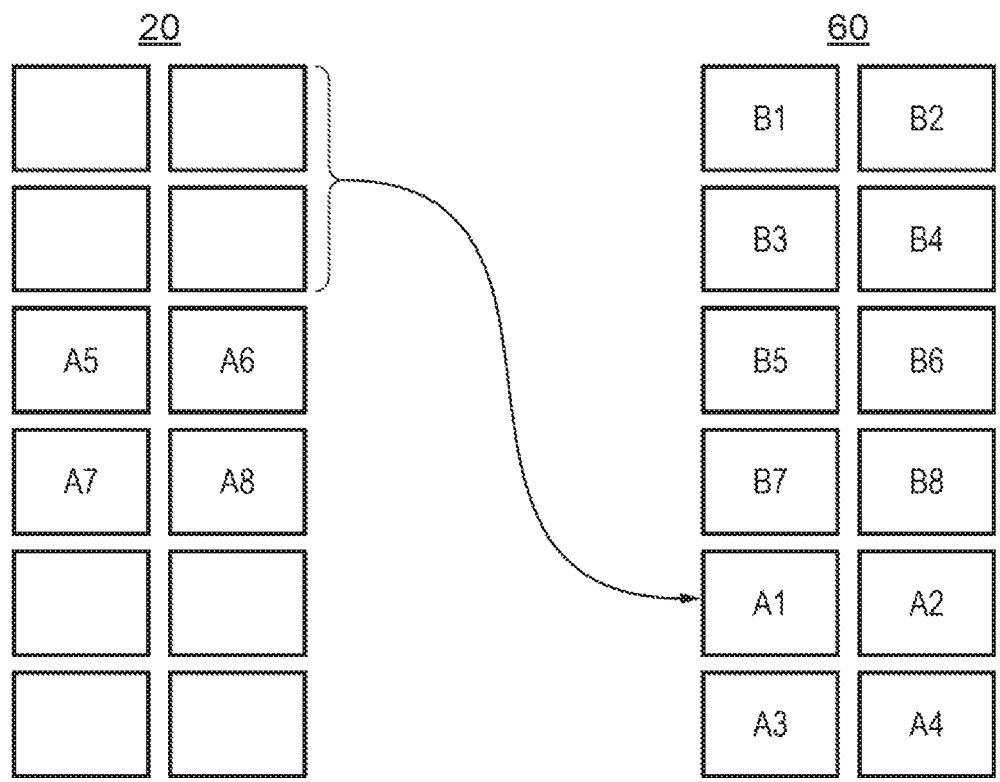

A first stage is illustrated schematically in FIG. 9b, in which the segments A1-A4 are transferred, by the data transfer controller 70, from the Rand 22 the suspend data memory 60. They are stored in the free space within the suspend data memory 60.

Figure 9C:
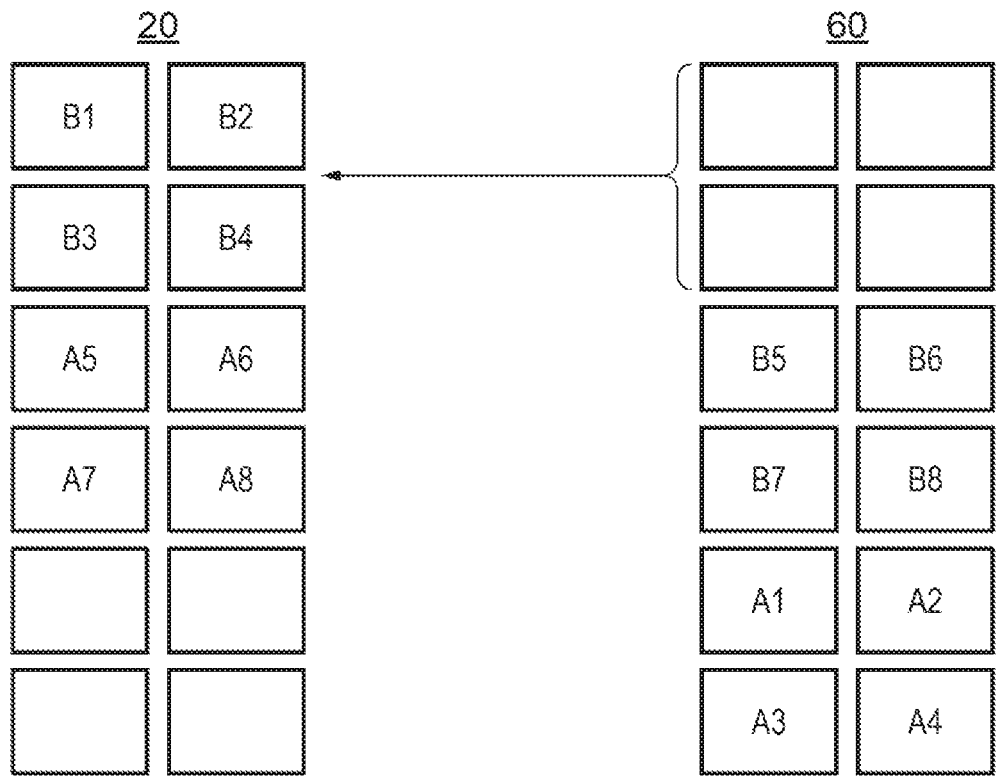

In FIG. 9c, segments B1-B4 are transferred from the suspend data memory to the RAM.

Figure 9D:
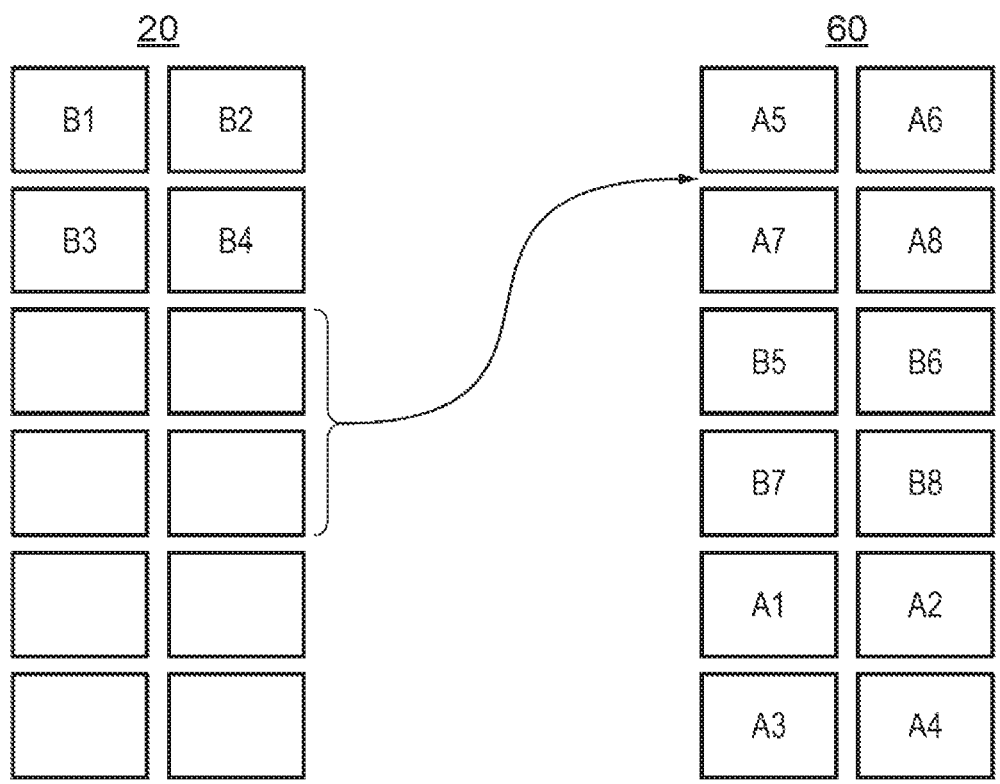
Figure 9E:
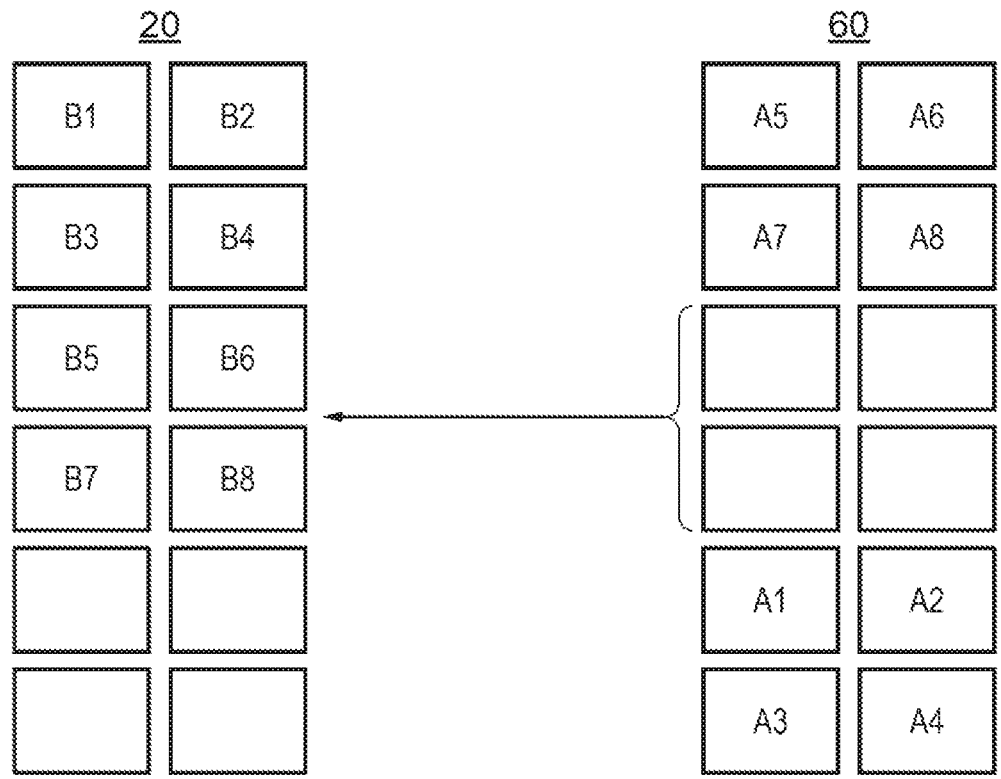
Figure 9F:
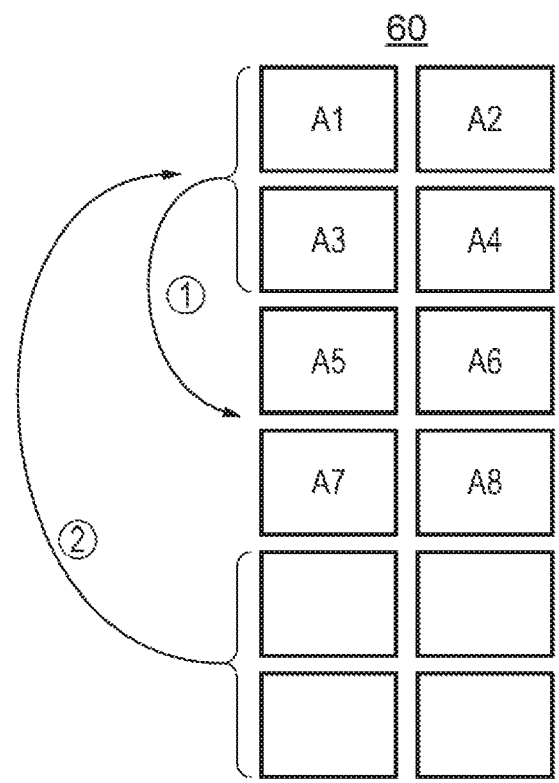

In FIG. 9d, the remaining segments of the currently executing application (A5-A8) are transferred from the RAM to the suspend data memory, and in FIG. 9e, the remaining segments of the suspended application (B5-B8) are transferred from the suspend data memory to the RAM. Finally, FIG. 9f schematically illustrates a sorting process of two stages (1) and (2) by which the data held in the suspend data memory is sorted into its original storage order.

Note that FIGS. 9a-9f simply illustrate one example of a staged data transfer process. Many other options are possible. For example, the segments B5-B8 could be transferred to the free space in the RAM 20 at the same time as the other transfer of FIG. 9c, and then sort as to the appropriate position as soon as the transfer of FIG. 9d has taken place. Also, the example shown handles the application data as two portions each representing 50% of the application data, but different divisions and numbers of portions could be used. If more stages are used, the process will tend to be a little slower, but it is still expected to be significantly faster than a similar transfer to and from a hard disk drive.

Accordingly, FIGS. 9a-9f provide an example of operations by which the data transfer controller is configured to transfer data to and from the suspend data memory as successive data portions.

A further optional variation (which could be combined with any of the other embodiments) could provide a system that allows the suspend data to be split between the suspend data memory and HDD. This might be useful in various situations, such as the example the case described above in which there are 12 memory elements, and a game to be suspended will take up 8 elements, but only four elements are free. The system could put half of the data in suspend data memory and half onto the HDD. This would be significantly slower than putting it all in suspend data memory, but still a lot quicker than putting all the suspend data directly onto the HDD.

Embodiments of the disclosure can include compression/decompression in the process. In other words, the contents of the RAM can be compressed before storing them in the suspend data memory, and decompressed when they are retrieved. This means that not as much suspend data memory is required, and the technique is also potentially quicker using compression and decompression. Compression and decompression can be implemented in hardware or software. If implemented in hardware, the compression/decompression stage can either go between the RAM and the data transfer controller (an advantage being that the compression/decompression resources can be shared across the suspend data memory, so saving cost and/or complexity), or between the data transfer controller and the suspend data memory (an advantage being that one hardware compression/decompression block can be provided for each memory element of the array 110, so as to increase the potential throughput rate of the system).

Figure 10:
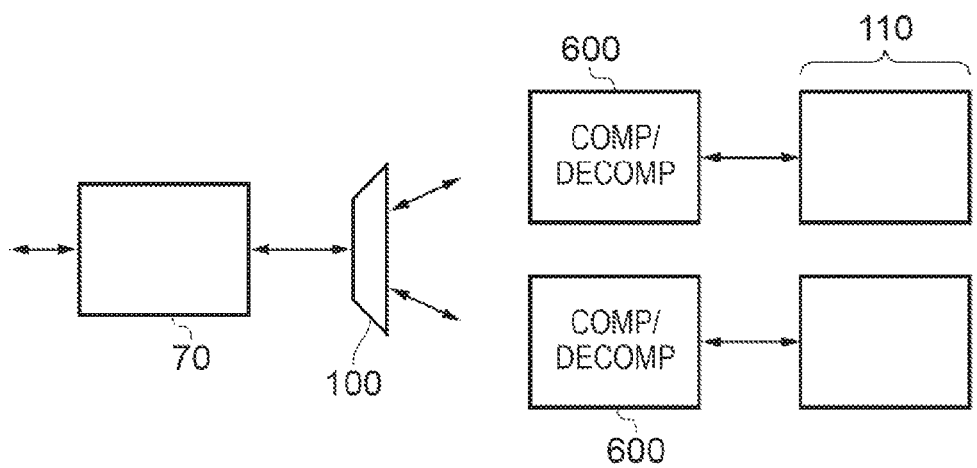
FIGS. 10 and 11 schematically illustrate respective arrangements using compression and decompression.
Figure 11:
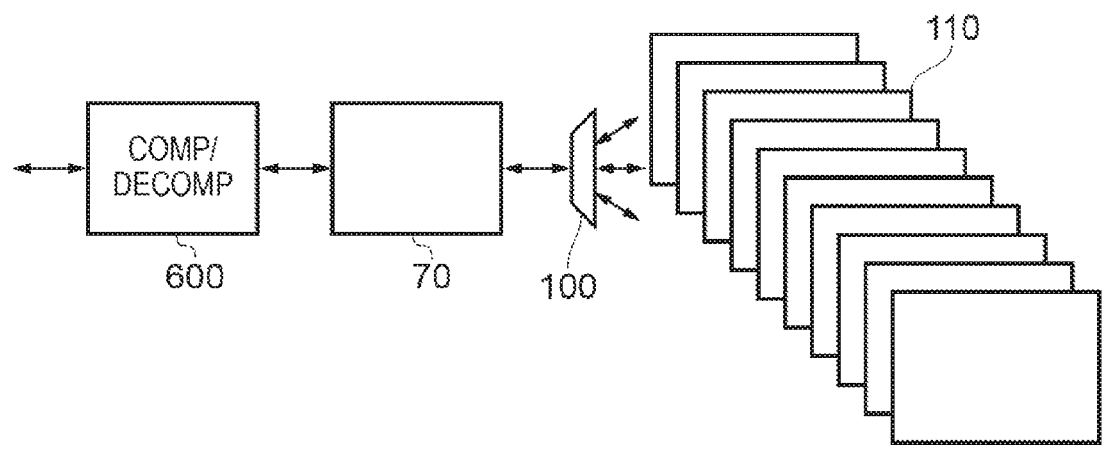

FIGS. 10 and 11 schematically illustrate respective arrangements using compression and decompression. Each of these diagrams stands in place of the arrangement of FIG. 2 and refers to the data transfer controller 70, the multiplexer-demultiplexer 100 and elements of the memory element array 110. These features will not be described further as they have been fully described above. However, an additional feature of note is a compression/decompression unit 600. In FIG. 10, each element of the memory element array 110 has a respective compression/decompression unit 600. Data being sent from the multiplexer-demultiplexer 100 to a respective element of the memory element array 110 is compressed by the appropriate compression/decompression unit, and compressed data being delivered from the element of the memory element array 110 to the multiplexer-demultiplexer 100 is decompressed by the appropriate compression/decompression unit.

In FIG. 11, a single compression/decompression unit 600 is arranged between the data transfer controller 70 and the bus 80 so that all data being passed to or from the data transfer controller 70 is compressed (in the case of data being stored in the suspend data memory) or decompressed (in the case of data being retrieved from the suspend data memory) by the compression/decompression unit 600. Clearly other arrangements are possible, for example in which multiple elements of the memory element array 110 share a compression/decompression unit 600. It will be appreciated that known compression and decompression techniques may be used.

Accordingly, FIGS. 10 and 11 provide examples of an apparatus comprising a data compression/decompression arrangement for compressing data to be stored in the suspend data memory and for decompressing data retrieved from the suspend data memory.

Figure 12:
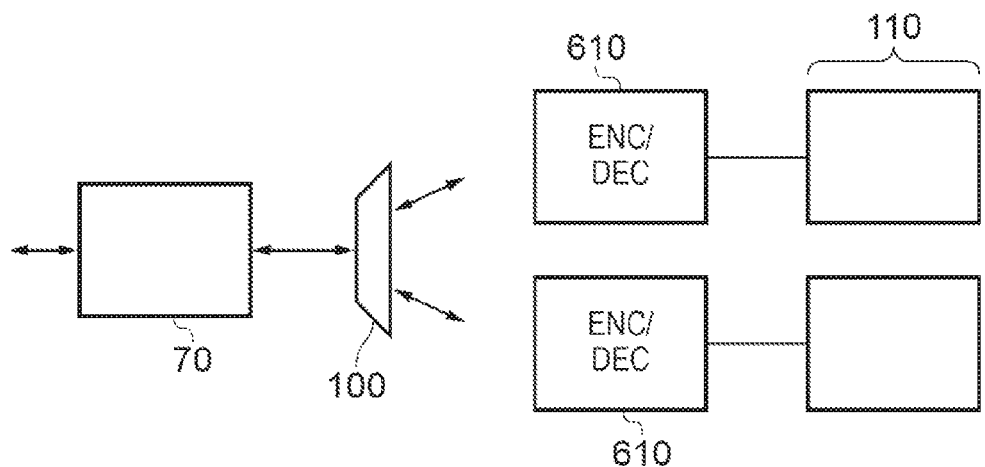
FIGS. 12 and 13 schematically illustrate respective arrangements using data encryption and decryption.
Figure 13:
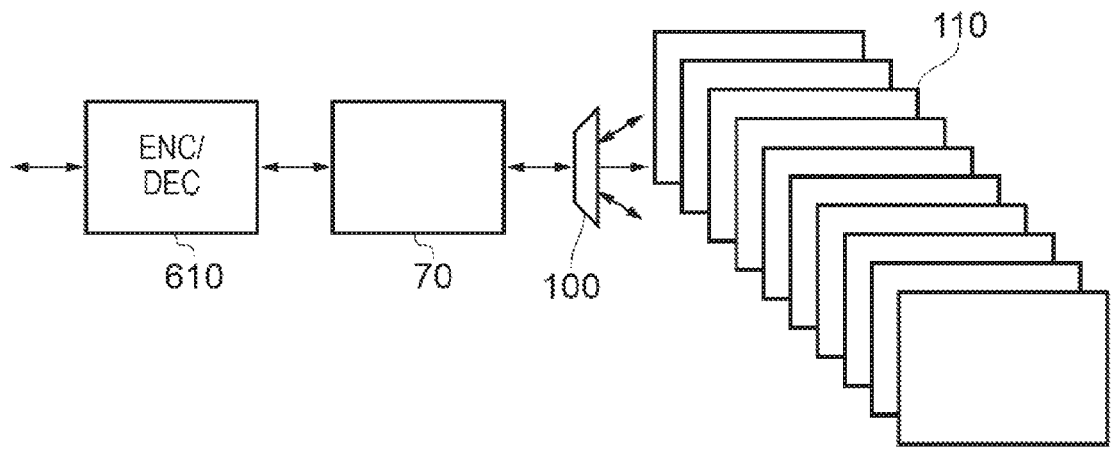

Similarly, the contents of the suspend data memory 60 may be encrypted. To achieve this, data being stored in the suspend data memory is subjected to an encryption process, and data being retrieved from the suspend data memory is subjected to a corresponding decryption process. For example, a known symmetric encryption and decryption process based on a secret key may be used. FIGS. 12 and 13 schematically illustrate respective arrangements using data encryption and decryption. Most aspects of these Figures respectively correspond to FIGS. 10 and 11 and will not be described again.

In FIG. 12, each element of the memory element array 110 has a respective encryption/decryption unit 610. Data being sent from the multiplexer-demultiplexer 100 to a respective element of the memory element array 110 is encrypted by the appropriate encryption/decryption unit 610, and encrypted data being delivered from the element of the memory element array 110 to the multiplexer-demultiplexer 100 is decrypted by the appropriate encryption/decryption unit 610. In FIG. 13, a single encryption/decryption unit 610 is arranged between the data transfer controller 70 and the bus 80 so that all data being passed to or from the data transfer controller 70 is encrypted (in the case of data being stored in the suspend data memory) or decrypted (in the case of data being retrieved from the suspend data memory) by the encryption/decryption unit 610. Clearly other arrangements are possible, for example in which multiple elements of the memory element array 110 share an encryption/decryption unit 610.

Accordingly, FIGS. 12 and 13 provide examples of an apparatus comprising a data encryption/decryption arrangement for encrypting data to be stored in the suspend data memory and for decrypting data retrieved from the suspend data memory.

It will be appreciated that the techniques of FIGS. 10-13 may be combined, in that compression and encryption may be used. It will also be appreciated that one or both of these processes may be implemented in software executed by the CPU 10, and/or that compression, decompression, encryption and/or decryption operations may be carried out by the data transfer controller and/or by the elements of the memory element array 110.

FIG. 14 schematically illustrates part of the functionality of the CPU 10, the I/O interface 30 and an associated display 700. Note that the CPU and I/O interface can have functions other than those illustrated in FIG. 14, and indeed would be expected to do so; in other words, only a subset of their functionality relevant to the present part of the discussion is illustrated in FIG. 14. Note that although these operations are particularly suited to an arrangement in which a separate suspend data memory is used, these features could also operate in the context of an arrangement in which the suspend data memory is not separate to other non-volatile storage.

As illustrated, the CPU 10 comprises a video generator 710 configured to generate display data relating to images to be displayed using the associated display 700 in response to the execution of the program code by the CPU 10. For example, the display data may comprise occasionally-changing still images, but in the present embodiments the display data comprises video data defining successive display frames or images, such that in the course of display, the frames are displayed successively, for example at frame intervals of 1/30 s or 1/60 s.

In normal use, the connection to the associated display 700 is such that the frames are displayed to a user (not shown) by the display 700. Note however that the apparatus is referred to as being connectable to the display 700, because the functionality of the apparatus itself in terms of generating display frames, buffering display data, suspending, resuming and re-displaying buffered display data can be such that the functionality is unchanged whether or not a display is actually connected. Note that the connection to the display, if present, may be a wired or wireless connection, for example.

The I/O interface 30 is shown as including the function of a display buffer 720 (although the buffer 720 could be implemented in other parts of the system such as in the RAM 20). The display buffer stores, in this example, m most recently provided display frames, where m is at least 2. In a practical system, the number m may be set as a system design parameter in dependence on the frame rate (for example, 30 frames per second, 60 frames per second) and the expected period of time taken for a full resume operation to be executed to the extent that the CPU 10 can restart generating new display frames. For example, if the expected time period is 3 seconds, and the frame rate is 60 frames per second, then a minimum of 180 frames are buffered. The value of 3 seconds used in this example itself provides an example of the variable "n" (a number of seconds of video) mentioned earlier in connection with FIGS. 5a and 5b.

A further feature of buffering most-recently displayed frame data is that it allows the user to remind himself or herself about operations of the application in the period leading up to the suspend operation (which may have been carried out some considerable time in the past). For this purpose, a period even longer than the minimum period discussed above, maybe 5 or 10 seconds, may be selected as a system design parameter.

The buffer 720 operates in such a way that the most recently generated frame is passed directly to the display 700, and that the most recently generated m frames are stored. So, as a new frame is provided by the video generator 710, it is displayed directly and is added to the buffered group of frames, displacing an oldest frame currently held in the buffer.

These aspects are illustrated by FIGS. 15 and 16, which schematically illustrate the generation, display and buffering of successive video frames.

In FIGS. 15 and 16, time is shown on a horizontal axis, with more recent times to the right hand side. Frames F1 . . . Fn are generated, one for display in each frame period, and are displayed substantially straight away after their generation (or at least within about a frame period of their generation, depending on the timing of the generation with respect to a frame clock). As drawn, the frame F1 was generated first (farthest in the past relative to the current position) and the frame F7 is the most recently generated and displayed frame in FIG. 15. For simplicity of the diagram, the buffer 720 is shown as having a capacity of just five frames, so that in FIG. 15 the five most recent frames (F3 . . . F7) are buffered.

FIG. 16 schematically illustrates the situation one frame period later. A new frame, F8 has been generated for display. The frame F8 is stored in the buffer, displacing the then oldest frame F3, so that the buffer now holds the frames F4 . . . F8.

Assume now that a suspend operation is initiated at the time shown in FIG. 16.

As well as all the other suspend operations discussed above, the contents of the buffer 720 are stored in the suspend data memory 60. This provides a record of the m most recently displayed frames leading up to the time at which the suspend operation was carried out. Bearing in mind that the suspend operation stores the CPU state and RAM contents relevant to execution of the current application at that time, this means that the suspend data memory contains not only a snapshot of the processor state but also a video record of the processor output in the period leading directly up to the suspend operation.

Figure 17:
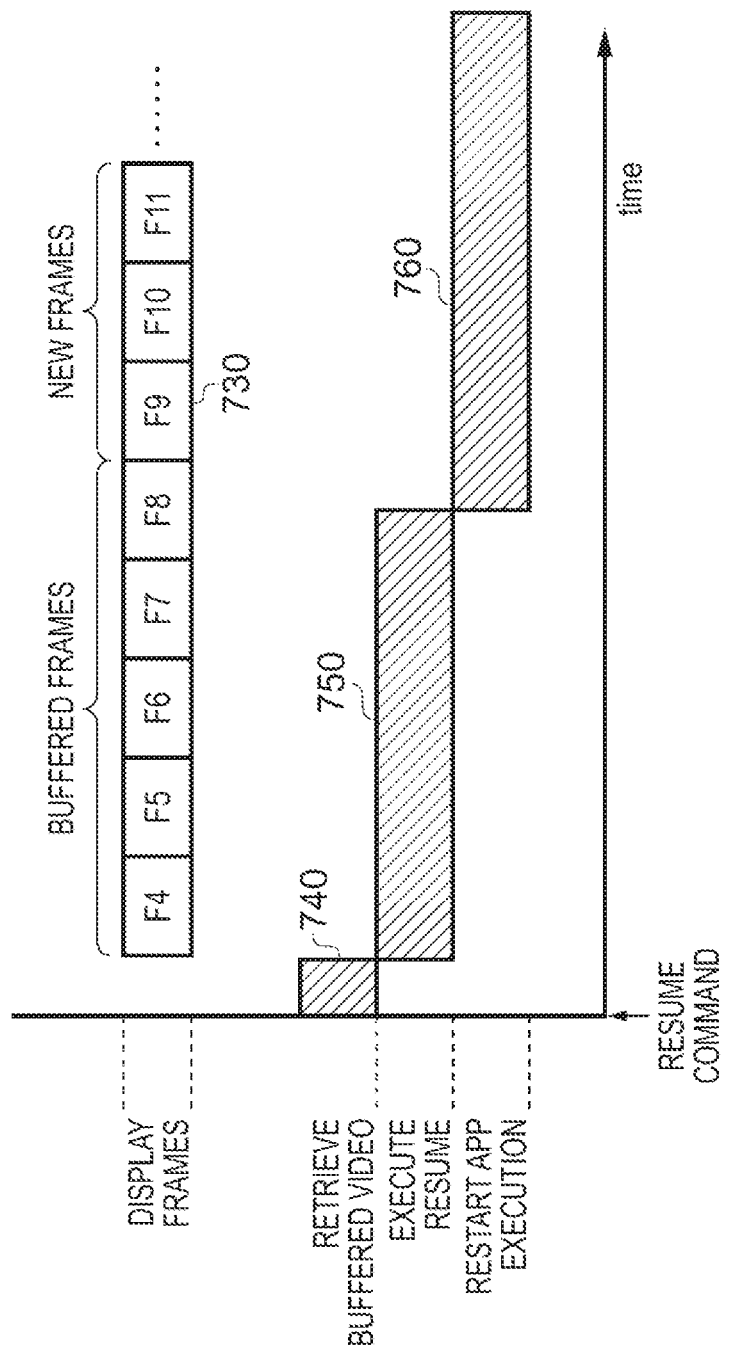
FIG. 17 is a schematic timing diagram.

FIG. 17 is a schematic timing diagram relating to a resume operation. Time is shown on a horizontal axis such that later times are towards the right hand side of FIG. 17. The time at which a resume operation is initiated is shown at the left side of the diagram.

In response to initiation of a resume operation, the data transfer controller first retrieves the buffered video data, as illustrated schematically by a block 740. As soon as this has been carried out, or indeed as soon as sufficient information from the earliest-stored buffered frame has been retrieved, the CPU then starts to display the buffered video frames in their successive order. In embodiments, the CPU does this starting at the oldest- or earliest-stored frame, but in other examples the CPU could elect to start the replay part-way through the m buffered video frames. The successive display of the buffered frames F4 . . . F8 is shown schematically by blocks 730.

The CPU then executes the remainder of the resume operation, as illustrated by a schematic block 750, including retrieving data defining the CPU state and the RAM contents. Note that this operation is shown as starting after the block 740, but it could overlap the block 740 partially or completely. The CPU carries out the operations represented by the block 750 while the buffered video frames F4 . . . F8 are being displayed, such that by the time the end of the frame period relating to the display of the last (most recently buffered) frame F8 is reached, the CPU has been able to recreate its previous state and reload the RAM with its previous contents, and has generated a new next frame F9 for display. Operations of the CPU in the execution of the resumed application then continue. In this way, the display of the previously buffered video frames F4 . . . F8 provides enough time for the CPU to resume operations and prepare the next display frame F9 so that the display of the frame F9 can directly follow the display of the frame F8.

Accordingly, the timing diagram of FIG. 17 provides an example of the data transfer controller retrieving display data relating to the resumed application from the suspend data memory (at the block 740). The diagram also provides an example of the processor causing the display to display information based on the retrieved display data (for example, replaying video material using retrieved video frames F4 . . . F8) while the resume instruction is being completed (the block 750 as an example). Note that the block 750, representing the execution of the rest of the resume operation (apart from the retrieval of the display data) may take less time than the display period of the retrieved display data (five frame periods in this example), and indeed it is an advantageous design feature that the amount of buffered display data stored in the suspend data memory is enough such that the resume operation will have time to spare in order to complete before the end of a display period associated with the retrieved display data. This provides a safety margin so as to provide that the CPU is ready to restart execution of the application in order to have a next display frame (F9 in this example) ready for display as soon as the end of the display period of F8 is reached. Accordingly, the period 750: (a) can overlap with the period 740; (b) but does not have to overlap or even be exactly adjacent to the period 740; (c) can extend to the end of the display period of the retrieved display data; (d) but advantageously, can end before the end of the display period of the retrieved display data. Also, (e) if the period 750 takes an unexpectedly long time, for whatever reason, the CPU can extend the display period of one or more of the retrieved frames (for example, the last frame F8, though more than one frame could be displayed for an extended period) so that the operations associated with the period 750 may finish while the retrieved display data is being displayed. All of these are consistent with the display of information based on the retrieved display data while the resume instruction is being completed.

Figure 18:
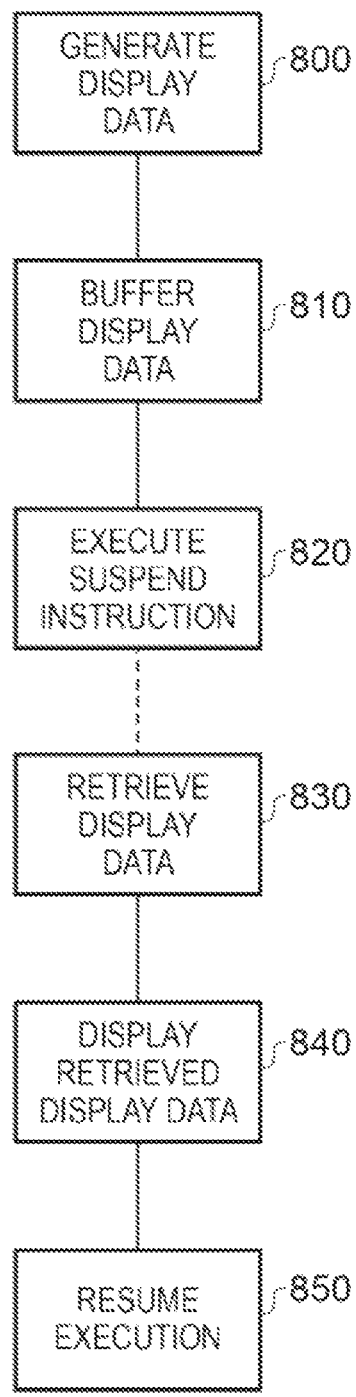
FIG. 18 is a schematic flowchart illustrating some operations of the apparatus of FIG. 1.

FIG. 18 is a schematic flowchart illustrating some operations of the apparatus of FIG. 1, illustrating a method of operation of a data processing apparatus (such as that of FIG. 1) having a processor 10 having an internal state dependent upon execution of program code by the processor; a non-volatile data storage arrangement 40, 50 configured to store program code for one or more applications; a random access memory 20 configured to store temporary data relating to a current operational state of program execution while the processor is executing the program code for a current application; and a non-volatile suspend data memory 60 (which, for example, may be separate to the non-volatile data storage arrangement);

the method comprising:

generating (at a step 800) display data relating to images to be displayed using the associated display in response to the execution of the program code;

buffering (at a step 810) display data relating to a most recent period of execution of a currently executing application;

in response to a suspend instruction (at a step 820), transferring data from the random access memory relating to the currently executing application, data relating to a current internal state of the processor and the buffered display data to the suspend data memory; and in response to a resume instruction, retrieving (at a step 830) the display data relating to the resumed application from the suspend data memory, and displaying (840) information based on the retrieved display data while the resume instruction is being completed; and resuming execution of the application (at a step 850) by transferring data from the suspend data memory to the random access memory and to the processor so as to recreate the state of execution of an application at the time that the suspend instruction was executed.

Respective aspects and features are defined by the following numbered clauses:

1. Data processing apparatus connectable to an associated display, the apparatus comprising:

a processor having an internal state dependent upon execution of application program code by the processor, the processor being configured to generate display data relating to images to be displayed using the associated display in response to the execution of the program code and to buffer display data relating to a most recent period of execution of a currently executing application;

a non-volatile data storage arrangement configured to store program code for one or more applications;

a random access memory configured to store temporary data relating to a current operational state of program execution while the processor is executing the program code for the currently executing application;

a non-volatile suspend data memory; and a data transfer controller configured, in response to a suspend instruction, to transfer data from the random access memory relating to the currently executing application, data relating to a current internal state of the processor and the buffered display data to the suspend data memory, and configured, in response to a resume instruction, to transfer data from the suspend data memory to the random access memory and to the processor so as to recreate the state of execution of an application at the time that the suspend instruction was executed, and to retrieve the display data relating to the resumed application from the suspend data memory, the processor causing the display to display information based on the retrieved display data while the resume instruction is being completed.

2. Apparatus according to clause 1, in which the suspend data memory comprises:

two or more memory elements, each configured to store a plurality of data bytes, the two or more memory elements being arranged so as to read or write data in parallel with respect to one another; and a multiplexer-demultiplexer configured to route data to be stored by or retrieved from the suspend data memory to or from the two or more memory elements, so that the data read or write rate for the suspend data memory is greater than the data read or write rate for a single such memory element.

3. Apparatus according to clause 1 or clause 2, in which the data transfer controller is configured to transfer data relating to a first application from the random access memory and the processor to the suspend data memory during a first time period, and to transfer data relating to a second application from the suspend data memory to the random access memory and the processor during a second time period which at least partially overlaps the first time period.

4. Apparatus according to clause 1, in which the buffered display data defines a display view as seen by a user.

5. Apparatus according to clause 4, in which:

the buffered display data comprises video data defining successive display frames; and the buffered display data relating to a most recent period of execution of a currently executing application comprises display data defining at least two successive display frames.

6. Apparatus according to clause 5, in which, in response to a resume instruction, the processor is configured to replay the video data and then to continue execution of the resumed application at the end of replay of the video data.

7. Apparatus according to any one of the preceding clauses, in which the data transfer controller is configured to detect whether the non-volatile data storage arrangement currently stores program code relating to a version of an application in respect of which a resume instruction has been issued, and if not, the data transfer controller is configured not to execute that resume instruction.

8. Apparatus according to any one of the preceding clauses, in which the data transfer controller is configured to transfer data from the resume memory to the non-volatile data storage arrangement in order to generate free space in the resume memory for execution of a next suspend instruction.

9. Apparatus according to any one of the preceding clauses, in which:

the random access memory has a data size sufficient to hold data relating to no more than one currently executing application; and the suspend data memory has a data size sufficient to store data relating to the execution of more than one application.

10. Apparatus according to any one of clauses 1 to 8, in which:

the random access memory has a data size sufficient to hold data relating one or more currently executing applications; and the suspend data memory has a data size sufficient to store data relating to the execution of one or more applications.

11. Apparatus according to any one of the preceding clauses, in which the suspend data memory comprises one or more flash memory elements.

12. Apparatus according to any one of the preceding clauses, comprising a data compression/decompression arrangement for compressing data to be stored in the suspend data memory and for decompressing data retrieved from the suspend data memory.

13. Apparatus according to any one of the preceding clauses, comprising a data encryption/decryption arrangement for encrypting data to be stored in the suspend data memory and for decrypting data retrieved from the suspend data memory.

14. Apparatus according to any one of the preceding clauses, in which the data transfer controller is configured to transfer data to and from the suspend data memory as successive data portions.

15. Apparatus according to any one of the preceding clauses, in which the suspend data memory is separate to the non-volatile data storage arrangement 16. A computer games apparatus comprising data processing apparatus according to any one of the preceding clauses.

17. A method of operation of a data processing apparatus having a processor having an internal state dependent upon execution of program code by the processor; a non-volatile data storage arrangement configured to store program code for one or more applications; a random access memory configured to store temporary data relating to a current operational state of program execution while the processor is executing the program code for a current application; and a non-volatile suspend data memory;

the method comprising:

generating display data relating to images to be displayed using the associated display in response to the execution of the program code;

buffering display data relating to a most recent period of execution of a currently executing application;

in response to a suspend instruction, transferring data from the random access memory relating to the currently executing application, data relating to a current internal state of the processor and the buffered display data to the suspend data memory; and in response to a resume instruction, retrieving the display data relating to the resumed application from the suspend data memory, and displaying information based on the retrieved display data while the resume instruction is being completed, and resuming execution of the suspended application by transferring data from the suspend data memory to the random access memory and to the processor so as to recreate the state of execution of an application at the time that the suspend instruction was executed.

18. Computer software which, when executed by a computer, causes the computer to execute the method of clause 17.

19. A non-transitory machine-readable storage medium which stores computer software according to clause 18.

As discussed, the techniques can be carried out, at least in part, in software, so that the present embodiments include a method of operation of a data processing apparatus having a processor having an internal state dependent upon execution of program code by the processor; a non-volatile data storage arrangement configured to store program code for one or more applications; a random access memory configured to store temporary data relating to a current operational state of program execution while the processor is executing the program code for a current application; and a non-volatile suspend data memory separate to the non-volatile data storage arrangement, the method comprising in response to a suspend instruction, transferring data from the random access memory relating to the currently executing application and data relating to a current internal state of the processor to the suspend data memory; and in response to a resume instruction, transferring data from the suspend data memory to the random access memory and to the processor so as to recreate the state of execution of an application at the time that the suspend instruction was executed. The following are also considered to represent embodiments: computer software which, when executed by a computer, causes the computer to execute the above method, and a non-transitory machine-readable storage medium (such as an optical disc, magnetic disc or flash memory) which stores such computer software.

It will be apparent that numerous modifications and variations of the present disclosure are possible in light of the above teachings. It is therefore to be understood that within the scope of the appended claims, the technology may be practised otherwise than as specifically described herein.

We claim:

1. Data processing apparatus connectable to an associated display, the apparatus comprising:

a processor having an internal state dependent upon execution of application program code by the processor, the processor being configured to generate display data relating to images to be displayed using the associated display in response to the execution of the program code and to buffer display data relating to a most recent period of execution of a currently executing application, in which the buffered display data defines a display view as seen by a user, the buffered display data comprising at least two successive display frames of video data relating to a most recent period of execution of a currently executing application;

a non-volatile data storage arrangement configured to store program code for one or more applications;

a random access memory configured to store temporary data relating to a current operational state of program execution while the processor is executing the program code for the currently executing application;

a non-volatile suspend data memory; and a data transfer controller configured, in response to a suspend instruction, to transfer data from the random access memory relating to the currently executing application, data relating to a current internal state of the processor and the buffered display data to the suspend data memory, and configured, in response to a resume instruction, to transfer data from the suspend data memory to the random access memory and to the processor so as to recreate the state of execution of an application at the time that the suspend instruction was executed, and to retrieve the buffered display data relating to the resumed application from the suspend data memory, the processor causing the display to display information based on the retrieved buffered display data while the resume instruction is being completed;

wherein, in response to the resume instruction, the processor is configured to replay the video data and then to continue execution of the resumed application at the end of replay of the video data.

2. Apparatus according to claim 1, in which the suspend data memory comprises:
two or more memory elements, each configured to store a plurality of data bytes, the two or more memory elements being arranged so as to read or write data in parallel with respect to one another; and
a multiplexer-demultiplexer configured to route data to be stored by or retrieved from the suspend data memory to or from the two or more memory elements, so that a data read or write rate for the suspend data memory is greater than a data read or write rate for a single such memory element.

3. Apparatus according to claim 1, in which the data transfer controller is configured to transfer data relating to a first application from the random access memory and the processor to the suspend data memory during a first time period, and to transfer data relating to a second application from the suspend data memory to the random access memory and the processor during a second time period which at least partially overlaps the first time period.

4. Apparatus according to claim 1, in which the data transfer controller is configured to detect whether the non-volatile data storage arrangement currently stores program code relating to a version of an application in respect of which a resume instruction has been issued, and if not, the data transfer controller is configured not to execute that resume instruction.

5. Apparatus according to claim 1, in which the data transfer controller is configured to transfer data from the resume memory to the non-volatile data storage arrangement in order to generate free space in the resume memory for execution of a next suspend instruction.

6. Apparatus according to claim 1, in which:
the random access memory has a data size sufficient to hold data relating to no more than one currently executing application; and
the suspend data memory has a data size sufficient to store data relating to the execution of more than one application.

7. Apparatus according to claim 1, in which:
the random access memory has a data size sufficient to hold data relating one or more currently executing applications; and
the suspend data memory has a data size sufficient to store data relating to the execution of one or more applications.

8. Apparatus according to claim 1, in which the suspend data memory comprises one or more flash memory elements.

9. Apparatus according to claim 1, comprising a data compression/decompression arrangement for compressing data to be stored in the suspend data memory and for decompressing data retrieved from the suspend data memory.

10. Apparatus according to claim 1, comprising a data encryption/decryption arrangement for encrypting data to be stored in the suspend data memory and for decrypting data retrieved from the suspend data memory.

11. Apparatus according to claim 1, in which the data transfer controller is configured to transfer data to and from the suspend data memory as successive data portions.

12. Apparatus according to claim 1, in which the suspend data memory is separate to the non-volatile data storage arrangement.

13. A computer games apparatus comprising a data processing apparatus, the data processing apparatus connectable to an associated display, the data processing apparatus comprising:
a processor having an internal state dependent upon execution of application program code by the processor, the processor being configured to generate display data relating to images to be displayed using the associated display in response to the execution of the program code and to buffer display data relating to a most recent period of execution of a currently executing application, in which the buffered display data defines a display view as seen by a user, the buffered display data comprising at least two successive display frames of video data relating to a most recent period of execution of a currently executing application;
a non-volatile data storage arrangement configured to store program code for one or more applications;
a random access memory configured to store temporary data relating to a current operational state of program execution while the processor is executing the program code for the currently executing application;
a non-volatile suspend data memory; and
a data transfer controller configured, in response to a suspend instruction, to transfer data from the random access memory relating to the currently executing application, data relating to a current internal state of the processor and the buffered display data to the suspend data memory, and configured, in response to a resume instruction, to transfer data from the suspend data memory to the random access memory and to the processor so as to recreate the state of execution of an application at the time that the suspend instruction was executed, and to retrieve the buffered display data relating to the resumed application from the suspend data memory, the processor causing the display to display information based on the retrieved buffered display data while the resume instruction is being completed;
wherein, in response to the resume instruction, the processor is configured to replay the video data and then to continue execution of the resumed application at the end of replay of the video data.

14. A method of operation of a data processing apparatus having a processor having an internal state dependent upon execution of program code by the processor; a non-volatile data storage arrangement configured to store program code for one or more applications; a random access memory configured to store temporary data relating to a current operational state of program execution while the processor is executing the program code for a current application; and a non-volatile suspend data memory;
the method comprising:
generating display data relating to images to be displayed using the associated display in response to the execution of the program code;
buffering display data relating to a most recent period of execution of a currently executing application, in which the buffered display data defines a display view as seen by a user, wherein the buffered display data comprises at least two successive display frames of video data relating to a most recent period of execution of a currently executing application;

in response to a suspend instruction, transferring data from the random access memory relating to the currently executing application, data relating to a current internal state of the processor and the buffered display data to the suspend data memory;

in response to a resume instruction, retrieving the buffered display data relating to the resumed application from the suspend data memory, and displaying information based on the retrieved buffered display data while the resume instruction is being completed, and resuming execution of the suspended application by transferring data from the suspend data memory to the random access memory and to the processor so as to recreate the state of execution of an application at the time that the suspend instruction was executed; and in response to the resume instruction, replaying the video data and then continuing to execute the resumed application at the end of replay of the video data.

15. A non-transitory machine-readable storage medium which stores computer software which, when executed by a computer, causes the computer to execute a method of operation of a data processing apparatus having a processor having an internal state dependent upon execution of program code by the processor; a non-volatile data storage arrangement configured to store program code for one or more applications; a random access memory configured to store temporary data relating to a current operational state of program execution while the processor is executing the program code for a current application; and a non-volatile suspend data memory;

the method comprising:

generating display data relating to images to be displayed using the associated display in response to the execution of the program code;

buffering display data relating to a most recent period of execution of a currently executing application, in which the buffered display data defines a display view as seen by a user, wherein the buffered display data comprises at least two successive display frames of video data relating to a most recent period of execution of a currently executing application;

in response to a suspend instruction, transferring data from the random access memory relating to the currently executing application, data relating to a current internal state of the processor and the buffered display data to the suspend data memory;

in response to a resume instruction, retrieving the buffered display data relating to the resumed application from the suspend data memory, and displaying information based on the retrieved buffered display data while the resume instruction is being completed, and resuming execution of the suspended application by transferring data from the suspend data memory to the random access memory and to the processor so as to recreate the state of execution of an application at the time that the suspend instruction was executed; and in response to the resume instruction, replaying the video data and then continuing to execute the resumed application at the end of replay of the video data.

16. A computer games apparatus according to claim 13, in which the data transfer controller is configured to detect whether the non-volatile data storage arrangement currently stores program code relating to a version of an application in respect of which a resume instruction has been issued, and if not, the data transfer controller is configured not to execute that resume instruction.

17. A computer games apparatus according to claim 13, comprising a data compression/decompression arrangement for compressing data to be stored in the suspend data memory and for decompressing data retrieved from the suspend data memory.

18. A computer games apparatus according to claim 13, comprising a data encryption/decryption arrangement for encrypting data to be stored in the suspend data memory and for decrypting data retrieved from the suspend data memory.

* * * * *